Figure 1:
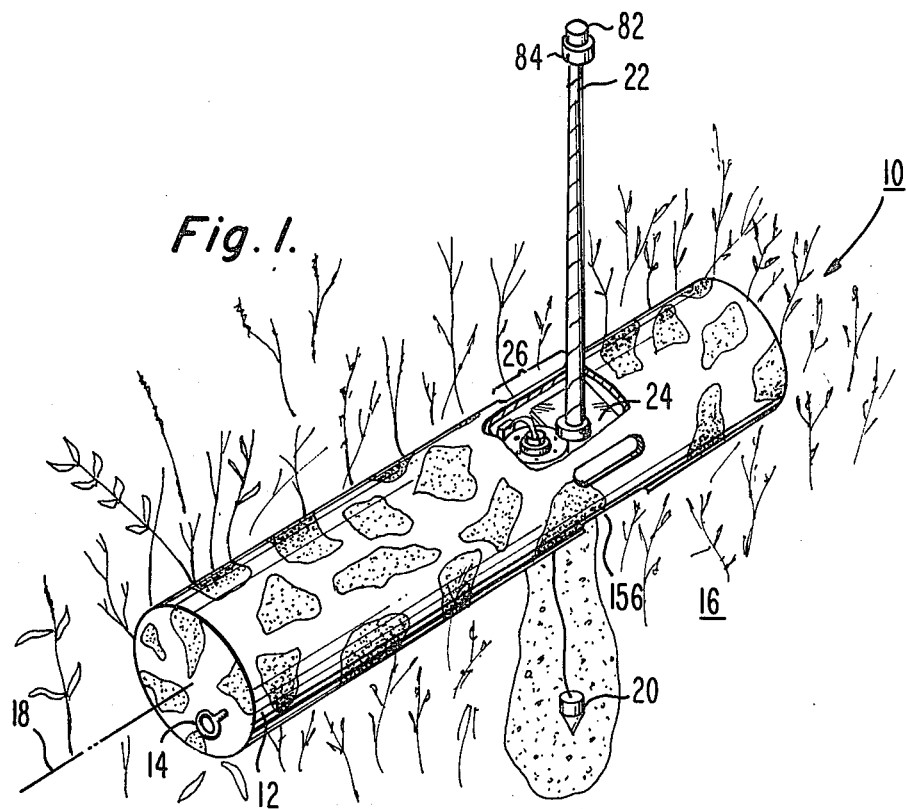

United States Patent [19]

Thornhill, Jr. et al.

[11] 4,292,861
[45] Oct. 6, 1981

[54] EARTH SELF-ORIENTING APPARATUS

[75] Inventors: John Thornhill, Jr., Tewksbury; Richard B. Elder, Acton, both of Mass.

[73] Assignee: RCA Corporation, New York, N.Y.

[21] Appl. No.: 33,266

[22] Filed: Apr. 25, 1979

[51] Int. Cl.³ ............................................ B23Q 17/00
[52] U.S. Cl. ............................ 74/813 R; 73/382 R; 102/401; 343/705
[58] Field of Search ............ 74/813 R, 813 L, 813 C, 74/816; 343/705; 102/8, 19.2; 73/382

[56] References Cited

U.S. PATENT DOCUMENTS

| 2,674,886 | 4/1954 | Evans | 73/382 |
| 3,568,201 | 3/1971 | Spoonamore et al. | 343/705 |
| 3,956,988 | 5/1976 | Pecksen | 102/8 |

Primary Examiner—Kenneth Dorner
Attorney, Agent, or Firm—Samuel Cohen; William Squire

[57] ABSTRACT

A rotor mounting a sensor to be inserted into the earth is rotatably mounted within and locked to a cylindrical housing. The latter may be dropped to the earth and may come to rest in any orientation. When at rest, the rotor is unlocked and a drive mechanism rotates the rotor with respect to the housing. Gravity causes a ball in a tortuous path in the rotor to traverse the path and to drop into one of a plurality of annularly spaced recesses in the housing when the rotor reaches a desired orientation. With the ball in place in a recess, a wedge surface on the rotor wedges against a portion of the ball extending from the recess and this stops the rotor—in the desired orientation.

19 Claims, 9 Drawing Figures

U.S. Patent  Oct. 6, 1981  Sheet 1 of 3  4,292,861

EARTH SELF-ORIENTING APPARATUS

The present invention relates to earth self-orienting apparatus.

It is sometimes desired to locate scientific instruments in wilderness and rural areas for detecting geographic and other phenomena. Such instruments may include seismic detectors, geophones, which sense noises or vibrations in the earth, or other sensing devices either for insertion into the earth or which are to extend into the atmosphere. An antenna is deployed to transmit data gathered from the sensing devices at that remote location. In extremely rural wilderness areas, which are difficult to reach by ground transportation, scientific instruments may be dropped from an aircraft by means of a parachute, for example.

When using a parachute to drop an instrument, the parachute itself has been employed to orient the instrument with respect to the earth during descent. The landing feet on the instrument are assumed to come to rest on the ground, holding the instrument upright and the earth is therefore assumed to be directly below the instrument. However, in very rough terrain the instrument may tumble or become entangled in overgrowth or the like, and become misoriented. In such a case a sensing device ejected from the instrument may be misdirected. For example, such a device intended for insertion into the ground may instead be deployed into the atmosphere causing a mission failure.

An apparatus embodying the present invention comprises a body including a plurality of annularly spaced elements, at least one of which will correspond to a desired orientation of the body with respect to the earth regardless the rest position of the body on the earth. The member to be oriented to the given orientation is rotatably mounted on the body and includes gravity responsive means which halt the rotation of the member relative to that one element which orients the member in the desired orientation.

Figure 2:
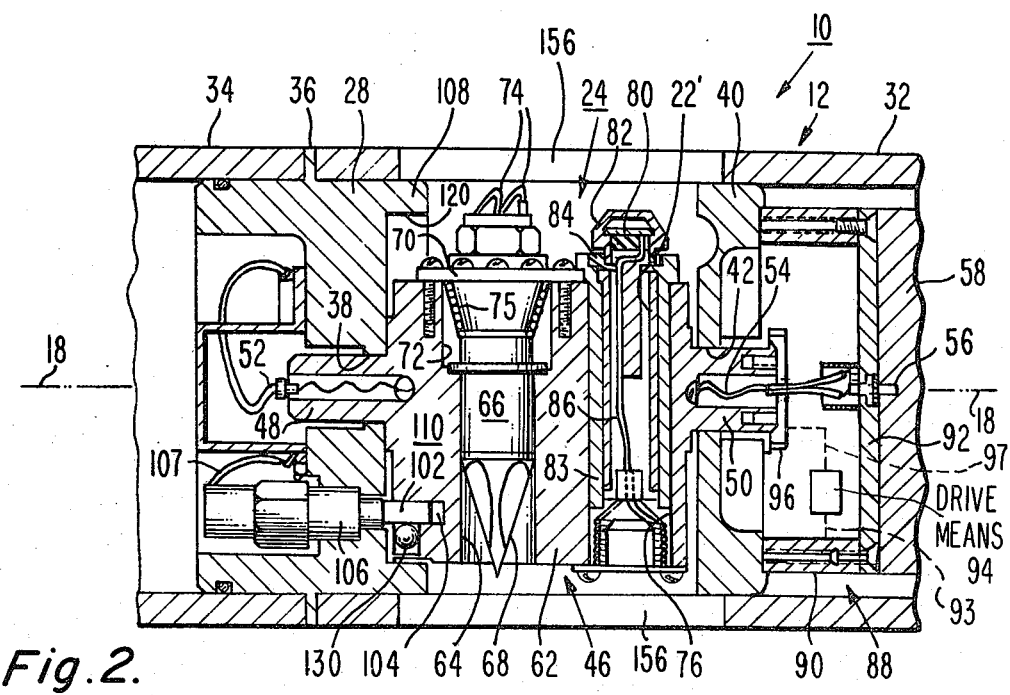
Figure 3:
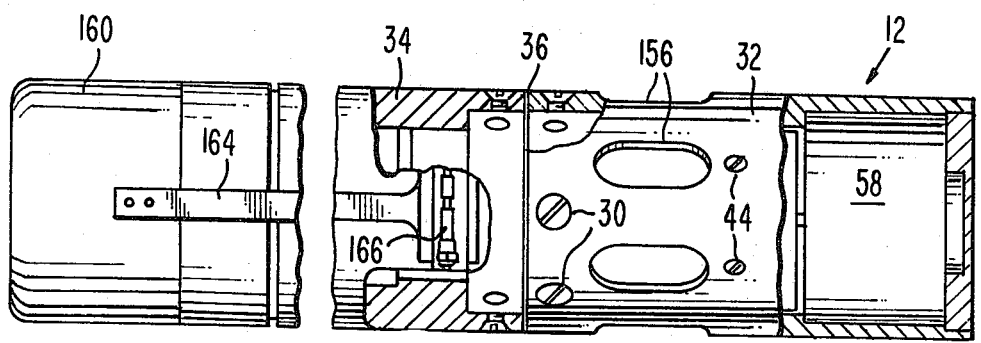
Figure 4:
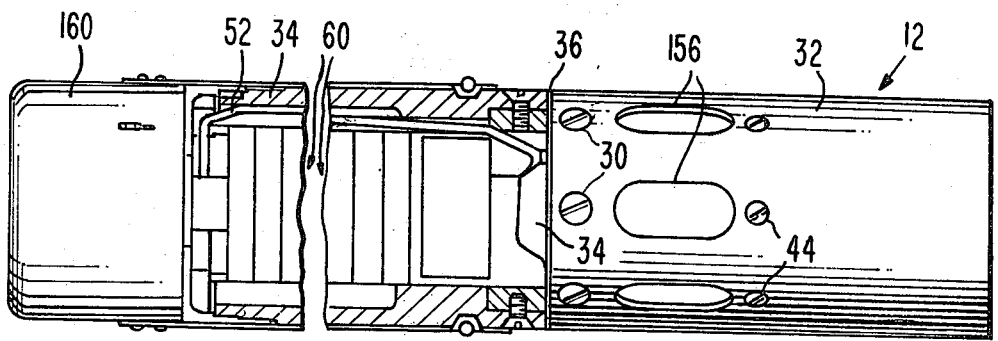
Figure 5:
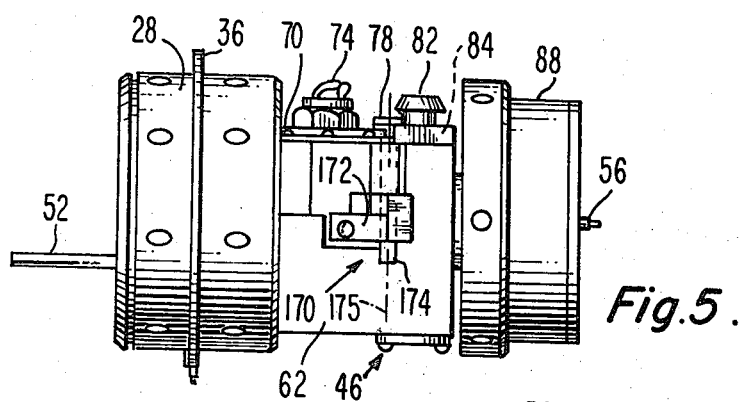
Figure 6:
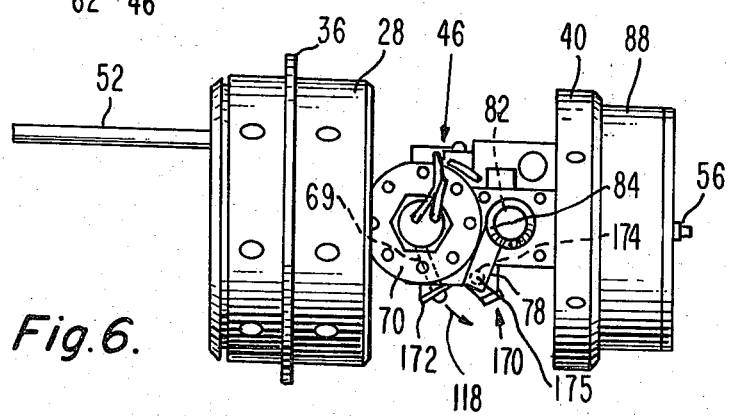
Figure 7:
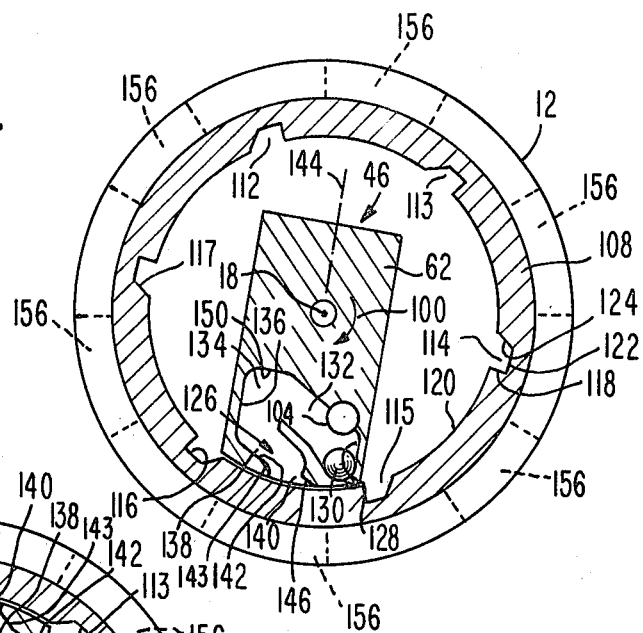

In the drawings:

FIG. 1 is a perspective, partially fragmented view of an apparatus embodying the present invention, FIG. 2 is a side elevation sectional view through the orienting mechanism of the apparatus of FIG. 1, FIGS. 3 and 4 are respectively sectional partially fragmented side elevation and plan views of the apparatus of FIG. 1, FIGS. 5 and 6 are respectively side elevation and plan views of the orienting mechanism of the apparatus of FIGS. 1 and 2, and FIGS. 7, 8 and 9 are end sectional views of the orienting mechanism of the apparatus of FIG. 1 useful in illustrating the operation of the orienting mechanism.

In FIG. 1, apparatus 10 comprising an elongated cylindrical housing has been dropped from an aircraft via parachute (not shown). Immediately after opening of the parachute, the apparatus was automatically cut free from the parachute by a cutting device. The parachute serves to orient the apparatus for free fall. In free fall, apparatus 10 falls to earth with its elongated axis parallel to the direction of fall to minimize tumbling during its descent. Upon impact, the housing tumbles somewhat along the earth coming to rest in some arbitrary orientation relative to the longitudinal axis 18 of the housing 12. The apparatus 10 could also be fired from a cannon.

Apparatus 10 inserts a geophone 20 or other sensor into the earth for sensing earth phenomena and ejects an antenna 22 into the atmosphere for transmitting data sensed by geophone 20 to a remote receiver. A microphone 80 can also be located at the tip of the antenna for sensing noises. As can be appreciated, as the apparatus 10 is in any arbitrary orientation when at rest, there is no guarantee that the sensors are properly oriented to be driven into the earth and atmosphere, respectively. In accordance with the present invention, after the apparatus comes to rest and prior to the insertion phase, self-orienting apparatus to be described, enclosed within the housing 12 changes the position of the geophone 20 and antenna 22, as required, for proper insertion.

Self-orienting mechanism 24 is positioned generally at location 26, FIG. 1 and its details are shown in FIG. 2. The mechanism includes an adapter 28 which is fastened to the housing 12 by a plurality of screws 30 (FIG. 3). The housing 12 comprises two cylindrical members 32 and 34 which abut flange 36 on adapter 28. Adapter 28 is a circular disc-like member that has a centrally positioned bore 38 which is concentric with housing 12 about axis 18. Bore 38 serves as a shaft bearing.

A second circular disc-like adapter 40 is axially spaced from adapter 28 and has a bore 42 concentric with housing 12 about axis 18. Adapter 40 is secured to housing 12 by screws 44 (FIG. 3).

Mounted for rotation about axis 18 within bores 28 and 42 is a rotor assembly 46. Assembly 46 has a shaft 48 which is rotatably mounted within bore 38 and a shaft 50 which is rotatably mounted in bore 42. The shafts 48 and 50 each have a hollow core for passing wiring 52 and 54 respectively therethrough. Shafts 48 and 50 rotate about common axis 18.

The wiring 54 is connected at one end to battery connector 56 which mates with battery 58 and at the other end form a harness with other wires at 52. The wiring 52 interconnects with electronic disc-like modules 60 mounted within cylindrical member 34 (FIG. 4). The wiring 52 interconnects the various components on the rotor assembly 46 to the electronics and power supply circuitry housed within the modules 60.

The rotor assembly 46 includes a rotor body 62 from which the shafts 48 and 50 extend in opposite directions. A transverse bore 64 extends through the body approximately centrally thereof and at right angles to the axis 18. Bore 64 houses a geophone 66 or other scientific instrument to be inserted into the ground. A pointed penetrating member 68 is mounted to the geophone to enable the geophone to penetrate deeply within the earth.

A breach 70 is mounted to the rotor body 62 on a side opposite the penetrating member 68. The breach 70 is mounted within an enlarged bore 72 which is an extension of bore 64. The breach 70 contains an explosive charge which is ignited by a pulse of energy transmitted along wires 74 from the electronic control modules 60 (FIG. 4) via wires 52. Wrapped around the breach 70 is an umbilical coil 75 which is connected to the geophone 66 at one end and to the electronic circuitry in the control modules 60 at the other end, and in particular, to the transmitting portion of that circuitry. Adjacent and parallel to bore 64 is a second bore 76. Bore 76 extends through opposite sides of the body 62. Mounted within bore 76 is antenna housing 83. Within housing 83 is an antenna 22' in its retracted position. Antenna pedestal 84 is mounted on the end of antenna 22'.

Antenna 22' is a helical spring coil device which in its normal free standing position is extended as shown by antenna 22 of FIG. 1. The antenna 22' comprises a helical spring loaded coil member which when the spring is released, assumes its extended position comprising successive adjacent turns of a ribbon shaped conductor to form a tapered hollow rod like element as shown in FIG. 1 and when in the retracted position is under spring compression load. The antenna is held in the retracted position, FIG. 2, by a restraining lever 78 (FIG. 5). The restraining lever 78 overlaps an end of pedestal 84 preventing the antenna 22' from assuming its extended condition. Mounted on the pedestal 84 is a microphone 80 which is covered by cap 82. The microphone is connected to the electronic modules 60 by a wire 86 which is coiled at the lower end of the bore 76 in an umbilical coil. The antenna is also connected by other wiring to the electronic circuitry modules 60 for the purpose of transmitting radio signals containing the data sensed by the geophone 20 and microphone 80.

As can be appreciated, the apparatus 10 when rolled randomly over the surface of the earth can result in the alignment of the bores 64 and 76 in a direction such that exploding the charge in the breach 70 will drive the geophone 66 into the air, and release of the microphone will result in the antenna 22 being jammed into the ground, both of which conditions are, naturally, undesirable. Therefore, it is necessary before exploding the charge and releasing the antenna, to be certain that the geophone and antenna be properly oriented.

To accomplish this purpose a self-orienting mechanism is included in the apparatus 10. The self-orienting mechanism operation will be described in connection with FIGS. 7, 8 and 9. These FIGS. show the apparatus 10 in the artibrary position in which it came to rest. Note that the notch 115 is the one closest to the ground. The self-orienting assembly includes rotor drive assembly 88, FIG. 2. The rotor drive assembly 88 incluedes a cylindrical housing 90 and a cover 92. The drive assembly is secured to adapter 40 by screws. Connector 56 for the battery 58 is mounted to the cover 92. Mounted within the housing 90, as indicated by dashed line 93, is drive means 94, shown schematically as a box. The drive means is coupled to drive gear 96, as indicated by dashed line 97, the drive gear 96 being mounted on the end of shaft 50. Drive means 94 rotates the rotor assembly in direction 100, FIG. 7. By way of example, drive means 94 may include a gear train (not shown) and a coil spring (not shown) for driving the gear train. The coil spring may be a conventional spring such as one used as the wind-up mechanism of a mechanical clock.

However, prior to the orientation of the rotor assembly 46 to the desired position, the rotor is restrained from being driven by drive assembly 88 via restraining pin 102, FIG. 2, which is inserted in bore 104 in rotor body 62. The pin 102 is connected to pyrotechnic drive 106. Drive 106 may also be a solenoid type device. The drive 106 is mounted in adapter 28. The pin 102 secures the rotor in a fixed position and prevents the drive assembly 88 from operating. The pin also serves an additional function as will be described. The drive 106 is connected via wire 107 to the electronic control modules 60 and is operated at an appropriate time as will be described for retracting the pin 102 into the drive 106 and releasing the rotor for rotation in direction 100.

The adapter 28 has an annular flange 108 which extends partially over portion 110 of body 62. Formed in the radially inwardly facing surface 120 of flange 108 are a plurality of equally spaced recesses 112–117, inclusive, FIG. 7. The recesses are equally spaced 60° apart, there being six recesses in this case, although more or fewer can be provided in accordance with a given implementation. As the recesses are of the same shape, only one will be described.

Recess 114, for example, includes a side wall 118 which extends radially outwardly from the inner surface 120 of flange 108. A bottom wall 122 is approximately normal to a radial line extending through axis 18 and to wall 118. The side wall 124 slopes from bottom wall 122 toward the surface 120 in a direction away from wall 118.

The recesses 112–117 all generally lie in a common plane normal to axis 18 through portion 110 of body 62, rotor assembly 46, FIG. 2. Formed in body 62 is a recess which forms tortuous path 126. Path 126 faces adapter 28 which forms a "cover" over the path. Path 126 is generally "U" shaped having one end 128 of the "U" terminating in a ball retaining cavity for receiving ball 130, which may be a stainless steel ball of the ball bearing type. Pin 102, when in the rotor locking position shown in FIG. 2, reduces the traverse area of leg 132, path 126, adjacent end 128 an amount sufficient so as to lock ball 130 in end 128. Ball 130 is otherwise restrained in path 126 by adapter 28. The path leg 132 slopes radially toward axis 18 and in a direction approximately the same as direction 100 in which the rotor rotates. The cross leg portion 134 of the path is "V" shaped and has a side wall 136 which is generally parallel to a radial line through axis 18 and a side wall 150 approximately normal to wall 136. A second leg 138 of the "U", generally parallel to leg 132, terminates in a ball 130 discharge aperture 140 in the surface of body 62 facing surface 120. A reference axis 144 passes through axis 18 and the center of aperture 140. This axis 144 is parallel to bores 64 and 76 (FIG. 2) and the orienting mechanism changes the position of this axis, as required to cause it to point to the earth. Axis 144 lies and rotates in the plane of recesses 112–117.

Between wall 136 and aperture 140 is side wall 142 of path 126, leg 138. Side wall 142 is a plane surface which terminates at wall 143 which slopes more steeply toward surface 120. Wall 142 has a particularly important function in the operation of the self-orienting mechanism.

It has been determined by testing that the slope of the wall 142 with the horizontal provides timing action for starting the ball 130 rolling when the ball 130 is at the juncture of wall 136 and wall 142. When the wall 142 is at an angle of about 5° with a horizontal line (normal to the direction of gravity) the ball 130 starts to roll. Once the ball rolls on wall 142, it then rolls immediately thereafter into aperture 140. This action occurs prior to the rotor assembly 46 reaching the optimum orientation of axis 144 when the axis is aligned with that recess which is closest to the earth, recess 115 in this case. Wall 142 slopes at an angle α to axis 144 which may be 35°. The ball should be in the aperture 140 at about the time the aperture axis 144 approaches a recess which is closest to the earth and this has been predetermined to be at a 30° angle with the vertical. At a greater angle, the rotor may prematurely lock at a recess position which is not between axis 18 and earth and may result in geophone 20 not being inserted into the earth. Thus, the axis 144 will be at about 30° with the vertical when the ball starts rolling. This insures the axis 144 points to earth when the rotor is locked in place. That is, it is desired the ball 130 enter recess 115 but not recess 114.

Geophone bore 64 and the antenna bore 76 are both aligned parallel to axis 144. Therefore axis 144 should sufficiently intersect earth to insure device 68 enters the earth surface rather than deflecting off the earth surface. When axis 144 is approximately at 30° with a normal to the earth and approaching (in direction 100) the vertical the wall 142 slopes downwardly at about 5°. The rolling action of the ball is a function of static friction which varies with various factors, such as surface friction. By the time the ball rolls from wall 142 into aperture 140 it will then be ready to roll along surface 120 captured in aperture 140 and into the first occurring recess thereafter due to gravity and provide a locking action as will be described. Aperture 140 has a wall 146 on the other side of path leg 138 from wall 142. Wall 146 is tapered toward surface 120 of flange 108.

In operation of the self-orienting mechanism, when it has been determined that the housing 12 is at rest on the earth in a manner to be explained, a signal is applied to drive 106 which retracts pin 102 from bore 104, releasing the rotor assembly 46 for rotation and permitting the ball 130 to roll in the path 126 in response to the forces of gravity as the rotor assembly 46 rotates in direction 100.

Figure 8:
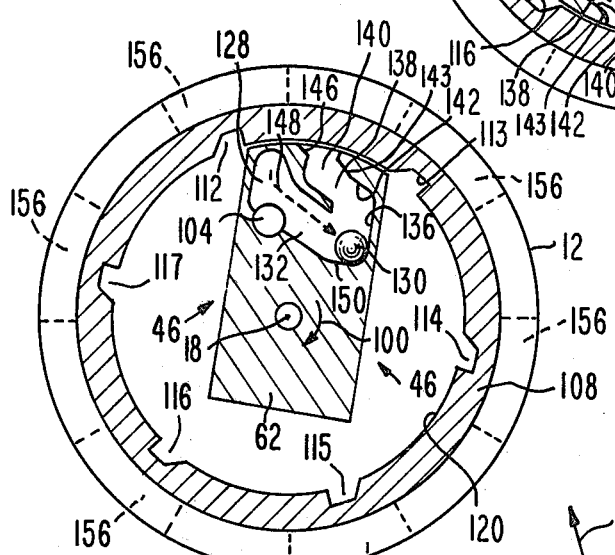
Figure 9:
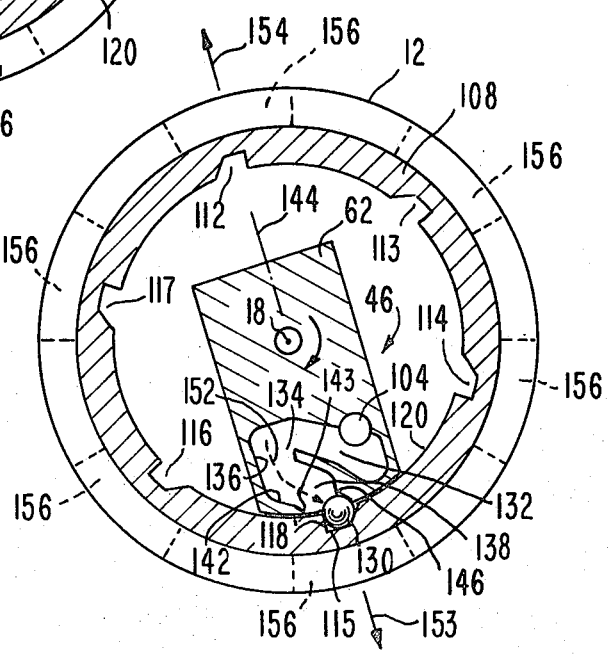

The drive assembly 88 then commences to rotate the rotor assembly 46 in the direction 100. As seen in FIG. 8, the rotor as illustrated, is approximately 180° opposite the position shown in FIG. 7. The ball 130 has rolled along the surface of path 126 of leg 132 in the dashed path 148. The ball then rests in the "V" intersection of wall 136 and wall 150. The rotor assembly 46 continues to rotate in direction 100. It is desired that ball roll in path 126 rather than bounce to insure that ball 130 enters aperture 140 only at the correct time, i.e., correct orientation of axis 144. The ball then follows the dashed path 152, FIG. 9. The ball enters the discharge aperture 140 prior to reaching recess 115 when surface 142 is about 5° with the horizontal. Ball 130 rolls along surface 120. Recess 115 is the first occurring recess in direction 100 after the ball 130 is on surface 120. Gravity drops ball 130 into recess 115.

The recess 115 (as all similar recesses) has a depth which is sufficiently shallow with respect to the ball 130, such that a portion of the ball is at all times within aperture 140. When the ball drops into the recess 115, the tapered wall 146 jams ball 130 against side wall 118' of recess 115. This locks the rotor assembly in the orientation shown.

In this orientation, the axis 144 intersects the earth (at the bottom of the drawing) at a sufficiently steep angle that firing of the geophone in the direction 153 parallel to axis 144 results in the geophone penetrating into the earth. Since the antenna extends in a direction parallel to this direction, it will extend in the opposite direction 154 into the atmosphere. It can be shown that regardless of the orientation or the housing 12, when axis 144 is in line with at least one recess 112–117, the axis 144 will be no more than 30° from the vertical. At this angle, the probability that the geophone will become buried in earth, when the explosive charge is fired, is very high and of course, in the absence of some overlying obstruction such as a tree trunk or the like the antenna and microphone will be properly deployed in the atmosphere, when the antenna is released.

As shown in FIGS. 1, 3 and 4, the cylindrical member 32 has a plurality of annularly spaced ports 156 which are in radial alignment with corresponding recesses 112–117. A pair of ports are diametrically opposite each other to permit the geophone 20 to be ejected through one port on one side of housing 12 and the antenna 22 to be ejected through the other port on the opposite side of housing 12. A pair of ports 156 will always be aligned with the antenna 22 and the geophone 20 when the rotor assembly 46 is locked in position prior to ejection.

In FIG. 3 parachute cover 160 is secured to housing 12 via straps 164. Straps 164 are longitudinal and are secured by a cable strap 164 to an aircraft dispenser (not shown). Within the cover 160 is a parachute (not shown) which is attached to the end of assembly 12 via lanyard pin 14 (FIG. 1).

To deploy apparatus 10, it is dropped from an aircraft at low altitude, for example 250 feet. At this time the aircraft dispenser ejects apparatus 10 and releases straps 164. The air stream around the falling assembly blows off the straps 164 and cover 160. The parachute (not shown) is deployed and pulls on the lanyard pin 14, activating a cutting device which immediately cuts the parachute free. When this occurs, the longitudinal axis 18 of assembly 12 is vertical with respect to the earth.

Pulling on the lanyard pin assembly also starts a timer circuit located in the deployment timer module of electronic modules 60. The timer module contains the circuits for generating two successive pulses delayed by 60 seconds from the time the pin 14 is pulled. One pulse activates the drive 106 after the first 60 seconds. The second 60 second pulse activates the geophone blasting cartridge located in the breach 70. It has been determined that within a 60 second time period after the lanyard pin 14 is pulled, the housing 12 will be at rest on earth. This is an assumption for a type of terrain and the height at which the assembly is dropped, among other factors. Of course, this will vary for each implementation. What is important is that the assembly be at rest at the end of this first interval, regardless of the duration of that interval.

Pulling on the lanyard pin 14 by opening of the parachute activates a switch which applies power to the system and connects the battery 58 to the various electrical modules, including the deployment timer module. At the end of the first 60 seconds, a pulse is sent to the pin drive 106 which retracts the pin 102, releasing the ball 130 and permitting the rotor assembly 46 to rotate, due to the spring drive action in the drive assembly 88. The rotor now begins to rotate from the position of FIG. 7, through the orientation of FIG. 8 and into the final orientation of FIG. 9. The ball follows the dashed paths 148 and 152 in FIGS. 8 and 9, respectively. The rotation of the rotor takes less than 60 seconds. This is built into the system. As the rotor rotates from the position of FIG. 8 in direction 100, the ball rolls along wall 136 until it reaches wall 142. Here the ball sits, it does not commence rolling until the wall 142 is approximately 5° with the horizontal as previously explained.

The wall 142, as explained previously, is at 35° with the normal to the axis 144. This angle, of course, may be slightly more or slightly less, depending upon the surface properties and the speed of rotation of the rotor, all of which are factors which determine the time when the ball begins to roll. Preferably, for a smooth surface on surface 142 and for rotating at 2.7 RPM, a slope of 35° is sufficient to start the ball rolling at the appropriate angle. The number of recesses provided and their spacing should result in at least one recess within about 30° of the vertical and between axis 18 and earth. This insures penetration of axis 144 into the earth at a sufficiently steep angle to prevent deflection of member 68 off the earth's surface. Of course, if an angle other than 60° (±30° with the vertical) were suitable for a particular implementation, then the recess spacing and slope of wall 142 would be made to accommodate that angle. For example, if nine equally spaced recesses were employed, then the target angle could be reduced to 40° (that ±20° from the vertical). Also other changes in the design will be required. For example, the slope of wall 142 would be some other angle.

Terminating surface 143 of aperture 140 is made steeper to hasten the entry of the ball into the recess. Static friction also takes a part in keeping the ball in position as the rotor assembly rotates. It is preferred that the surface of the path 126 be coated with polytetrafluoride (Teflon) to prevent the ball from freezing in place at very low temperatures of operation and to minimize friction.

The particular shape of the wall 118 of recess 112-117 is important only to the extent that it provides a jamming surface against which the ball may be jammed by sloping surface 146 of the aperture 140. The slope of wall 124 of each of the recesses is made sufficiently gradual so that the ball will roll into the recess rather than skip over the recess.

At the end of the second 60 second time period after the release of pin 102 a second pulse is generated by the deployment timer module. This pulse fires an explosive cartridge mounted within the breach 70, FIG. 2. This release gas under high pressure which blows the projectile comprising member 68 and geophone 66 into the earth. At the same time a conduit 69, shown in phantom view couples this high pressure gas to the antenna release mechanism 170, FIG. 5.

In FIG. 5, the pressure release mechanism includes an actuating arm 172 which covers a conduit 69 coupled to the breach through which the high pressure gas is blown. The arm 172 is mounted to pin 174 at one end and which is rotatably mounted in rotor body 62. The other end of pin 174 is attached to restraining lever 78. The high gas pressure forces the arm 172 in the direction 118 causing the pin 174 to rotate about its axis 175. The pin, which is secured to lever 78 causes the lever to rotate away from cap 82 and antenna pedestal 84 to thereby release the antenna. The stored spring energy of the helical spring of antenna 22', forces the antenna radially outwardly to the position shown in FIG. 1. At this time the unit commences operation.

Suitable safety devices may be employed, such as a switch (not shown) which prevents operation of the pressure blow out devices except in proper orientation. This could be an orientation switch which will not close the circuit except when the rotor assembly 46 is in its proper earth orientation.

What is claimed is:

1. An earth self-orienting apparatus, comprising:
a body including a plurality of spaced elements lying in a plane at least one of which corresponds to a predetermined orientation of said body with respect to the earth regardless the orientation of the body with respect to earth, said body including means for orientating said body about an axis approximately normal to the force of gravity,
a member to be oriented to said predetermined orientation rotatably mounted to said body for rotation in said plane including locking means having a first neutral position on said member as it rotates and a second locking position which when engaged with any of said elements locks said member to said body in accordance with the orientation of that element, said locking means including means responsive to the earth orientation of said member for causing said locking means to move from said first to said second positions in response to the force of gravity and engage said at least one element and thereby lock said member to said body in said predetermined orientation, and
means for rotating said orientating member with respect to said body.

2. The apparatus of claim 1 wherein said body is cylindrical, said elements lying in a plane normal to the longitudinal axis of the body, said elements being substantially radially equidistant from said longitudinal axis, said means for rotating said member about said axis, said locking means rotating in said plane.

3. The apparatus of claim 2 wherein said elements are substantially equally spaced from each other.

4. The apparatus of claim 3 wherein the elements are spaced about 60° from each other about said axis.

5. The apparatus of claim 1 wherein said locking means includes cavity means and a ball within said cavity means, said elements including recesses and lying in said plane, said cavity means having a ball dispensing aperture which rotates with said member in said plane, said cavity means including a tortuous path oriented to contain said ball within said cavity means as said member rotates, said path being oriented to release said ball via said aperture into said one element when said one element is between said member and the earth as said member rotates said aperture into alignment with and facing said one element, said recesses having a depth less than the diameter of said ball so that said ball remains partially in said aperture when in said one element.

6. The apparatus of claim 5 wherein said tortuous path is generally "U" shaped wherein the ball is normally contained in the cavity formed by the end of one leg of the "U" and the other leg terminates in said aperture.

7. The apparatus of claim 6 further including ball restraining means connected to said body for releasably locking said ball in said cavity.

8. The apparatus of claim 5 further including means connected to said body for releasably restraining said body from rotating and releasably restraining said ball in said cavity means to prevent the release of said ball.

9. The apparatus of claim 5 further including ball restraining means having ball release and restrain positions secured to one of said body and member for restraining said ball within said cavity means in said restrain position and for releasing said ball in said release position, and means for operating said restraining means.

10. The apparatus of claim 5 wherein said body has a cylindrical exterior surface, said surface being at right angles to said plane.

11. The apparatus of claim 10 wherein said body has an exterior surface adapted for rotating along the earth only about an axis normal to said plane.

12. The apparatus of claim 7 wherein said means for restraining includes means responsive to an input signal for placing said restraining means in the release position and means positioned on one of said body and member for generating said signal.

13. A self-orienting mechanism comprising, in combination:
- a first body formed with a plurality of reference elements thereon, the elements being substantially equally spaced from one another and lying in a circular path, the circular path lying in a plane which is in orientation closer to a vertical than to a horizontal plane, and the one of the elements being at the bottommost position, (that is, the one within a particular arc along the path defined by two radii extending from the center of the path at equal angles to the vertical,) depending upon the orientation of the body;
- a second body which it is desired to orient, the second body being mounted for rotation on the first body;
- means for rotating the second body about an axis passing through the center of the path relative to the first body; and
- gravity responsive means located on the second body, responsive to rotation of the second body, for halting the rotation of the second body when the second body reaches a given position relative to said one reference element.

14. A self-orienting mechanism as set forth in claim 13 wherein:
- said circular path comprises a circular surface defining an inner wall of a cavity within said first body and wherein said reference elements comprise notches in said inner wall; wherein
- said second body comprises a rotor within said cavity which is rotatable about an axis within said cavity and which includes an outer surface portion which passes over the notches as the second body rotates; and wherein
- said gravity responsive means comprises a gravity responsive element within said second body, and means for dropping that gravity responsive element into said one notch when said outer surface portion reaches said bottommost one of said notches.

15. A self-orienting mechanism as set forth in claim 14, wherein:
- said gravity responsive element comprises a ball of larger diameter than the depth of any notch; and wherein
- said means for halting rotation comprises a wedge surface formed as part of said outer surface portion of said second body which wedge surface bears against the portion of the ball projecting beyond said one notch, when the ball is in place in said one notch, whereby said second body is stopped when it reaches the desired position by the wedging action of the wedge surface against the ball as the second body attempts to rotate the wedge surface past the ball.

16. A self-orienting mechanism as set forth in claim 15, wherein:
- said gravity responsive means comprises a tortuous path in said second body along which the ball travels in response to gravity as the secod body rotates, the path having an opening at the end of the path which passes adjacent to the successive notches as the second body rotates, the path having a shape such that the ball does not reach the opening until the opening reaches said particular arc.

17. The combination of:
- an element formed with a circular internal surface, the surface includes a path lying in a generally vertical plane, the path being formed with notches therein substantially equally spaced along the path;
- a rotor within the element rotatable about an axis passing through the center of the circular path, the rotor including an outer surface portion which is closely spaced from the path and which travels along the path as the rotor rotates, the rotor being formed with a tortuous path therein in a generally vertical plane along which a ball can roll, the path having an opening which successively passes adjacent to successive notches as the rotor rotates, the shape of the path being such that the ball cannot reach the opening until the opening passes an imaginary line extending from the axis toward the earth at a given angle, not more than 45° from the vertical, and the notches being spaced no more than 90° from one another relative to the axis of rotation of the rotor; and
- a ball within the tortuous path having a diameter greater than the depth of the notches for dropping into a notch after it reaches the opening of the tortuous path and the opening reaches one of the notches located in a region along said circular path between said imaginary line and a second imaginary line passing through said axis and at a complementary angle to said first imaginary line relative to the vertical.

18. The combination as set forth in claim 17, wherein said element can assume different orientations so that any of the notches can be in any one of many different angular positions relative to the center of the path and earth.

19. The combination as set forth in claim 17, further including wedge means on a portion of the rotor for halting the rotation of the rotor when the ball drops into one of the notches in response to wedging action between said portion of the rotor and the portion of the ball extending from the notch.

* * * * *